United States Patent
Crane et al.

(10) Patent No.: US 6,171,026 B1
(45) Date of Patent: Jan. 9, 2001

(54) METHOD AND APPARATUS FOR REPLACEMENT OF PIPELINES

(75) Inventors: Robert F. Crane, Oconomowoc; Steven W. Wentworth, Brookfield, both of WI (US)

(73) Assignee: Earth Tool Company, L.L.C., Oconomowoc, WI (US)

( * ) Notice: Under 35 U.S.C. 154(b), the term of this patent shall be extended for 0 days.

(21) Appl. No.: 09/121,418

(22) Filed: Jul. 23, 1998

(51) Int. Cl.[7] .................................................. F16L 1/00
(52) U.S. Cl. ................................... 405/156; 405/184
(58) Field of Search ........................ 175/22, 53; 405/154, 405/156, 157, 174, 177, 184; 254/29 R, 30, 31

(56) References Cited

U.S. PATENT DOCUMENTS

| Re. 35,542 | | 6/1997 | Fisk et al. . |
| 3,181,302 | * | 5/1965 | Lindsay .................................... 405/156 |
| 4,006,521 | * | 2/1977 | Pedone ....................................... 175/53 |
| 4,024,721 | | 5/1977 | Takada et al. . |
| 4,026,371 | | 5/1977 | Takada et al. . |
| 4,448,567 | * | 5/1984 | Tsuda ........................................ 405/156 |
| 4,475,604 | | 10/1984 | Albertson et al. . |
| 4,505,302 | | 3/1985 | Streatfield et al. . |
| 4,637,756 | * | 1/1987 | Boles ......................................... 405/154 |
| 4,679,637 | | 7/1987 | Cherrington et al. . |
| 4,694,913 | | 9/1987 | McDonald et al. . |
| 4,720,211 | | 1/1988 | Streatfield et al. . |
| 4,738,565 | | 4/1988 | Streathfield et al. . |
| 4,925,344 | | 5/1990 | Peres et al. . |
| 4,945,999 | | 8/1990 | Malzahn . |

(List continued on next page.)

FOREIGN PATENT DOCUMENTS

306112 * 3/1989 (EP) ...................................... 405/184

OTHER PUBLICATIONS

"The Wedge" Service Line Replacement Tool, Jan. 1998, Info#163.

(List continued on next page.)

Primary Examiner—Eileen D. Lillis
Assistant Examiner—Frederick L. Lagman
(74) Attorney, Agent, or Firm—Phillips G. Meyers; Gardere & Wynne, L.L.P.

(57) ABSTRACT

A method and apparatus for replacement of an existing non-frangible pipeline includes creating open access to opposite ends of an pipeline and threading a cable having a wedge mounted thereon through the pipeline so that the wedge is positioned proximate one of the ends of the pipeline. The wedge is pulled through the pipeline from the other end of the pipeline so that the wedge slits the pipeline to form a slit pipe in a borehole. The slit pipe is removed from the borehole and a rear end portion of the slit pipe is attached to a front end portion of the replacement pipe . As the slit pipe is pulled out of the borehole, the replacement pipe is drawn into the borehole. The boring apparatus has a braided cable and a boring head having an expander sleeve and a lengthwise bore of sufficient diameter so that the cable can pass therethrough. An insert is disposed inside a loosened, enlarged diameter portion of the braided cable so that braids of the cable are wound about the insert, forming a stop portion of the cable having a diameter insufficient to pass through the bore of the boring head, so that the boring head can be towed through the ground by the cable with stop portion of the cable in contact with a rear portion of the boring head. The boring heads have cutting edges in a variety of sizes and the boring heads can be interchangeably mounted on the cable and the stop. The pulling machine has a portable pulling device with an elongated stake configured for insertion into the ground, a winch including the pulling cable and a fixture for mounting the winch so that the winch can operate to exert a horizontal pulling force with the cable and is secured against movement when the lower end portion of the stake is inserted into the ground.

21 Claims, 3 Drawing Sheets

U.S. PATENT DOCUMENTS

| | | |
|---|---|---|
| 5,070,948 | 12/1991 | Malzahn et al. . |
| 5,076,731 | 12/1991 | Luksch . |
| 5,098,225 | 3/1992 | Rockower et al. . |
| 5,112,158 * | 5/1992 | McConnell .......................... 405/156 |
| 5,127,481 * | 7/1992 | Hesse ................................. 405/184 |
| 5,173,009 * | 12/1992 | Moriarty ............................. 405/184 |
| 5,242,026 | 9/1993 | Deken et al. . |
| 5,603,383 | 2/1997 | Wentworth et al. . |
| 5,672,029 | 9/1997 | Boyer . |

OTHER PUBLICATIONS

Pipe Bursting, Hammerhead Mole, "Pipe Bursting—the Solution to Today's Hidden Problem" (1996).

HB38 Hydroburst™ Hydraulic Pipe Bursting System (undated).

Pneumatic Pipe Bursting Sytem, Portaburst (undated).

* cited by examiner

METHOD AND APPARATUS FOR REPLACEMENT OF PIPELINES

FIELD OF THE INVENTION

This invention relates to a method and apparatus that removes and replaces small, ductile, non-frangible pipes such as gas lines that are buried underground.

BACKGROUND OF THE INVENTION

A variety of systems are now known for the installation of underground pipes, particularly for the replacement of an existing deteriorated pipe. Directional boring apparatus for making holes through soil are well known and are used to replace existing pipe. The directional borer generally includes a series of drill rods joined end to end to form a drill string. The drill string is pushed or pulled through the soil by means of a powerful hydraulic device such as a hydraulic cylinder. See Malzahn U.S. Pat. Nos. 4,945,999 and 5,070,948, and Cherrington U.S. Pat. No. 4,697,775 (RE 33,793). The drill string may be pushed and rotated at the same time as described in Dunn U.S. Pat. No. 4,953,633 and Deken et al. U.S. Pat. No. 5,242,026. A spade, bit or head configured for boring is disposed at the end of the drill string and which may include an ejection nozzle for water to assist in boring.

In one variation of the traditional boring system, a series of drill string rods is used in combination with a percussion tool mounted at the end of the series of rods. The rods can supply a steady pushing force to the impact tool and the interior of the rods can be used to supply the pneumatic borer with compressed air. See McDonald et al., U.S. Pat. No. 4,694,913. This system has, however, found limited application commercially, perhaps because the drill string tends to buckle when used for pushing if the bore hole is substantially wider than the diameter of the drill string.

In one widely practiced method, a pneumatic impact boring tool such as a "Hammerhead Mole" (a registered trademark of Earth Tool Co.) boring tool is sent through the existing pipeline such that the head of the tool, which may be provided with blades that apply intense local pressure to the existing pipe, fractures or splits the existing pipe. See Streatfield et. al., U.S. Pat. Nos. 4,720,211, 4,738,565 and 4,505,302. A replacement pipe, typically made of plastic such as HDPE, can be drawn along behind the boring tool. Pneumatic impact boring tools are well known and are, for example, described in Wentworth et al. U.S. Pat. Nos. 5,025,868 or 5,337,837. The Streatfield et al. process has proven effective commercially because it bursts the old pipe into a multitude of fragments and replaces it with a new pipe at the same time. However, the system relies on a pneumatic impact tool, which in turn requires an air compressor. Exhaust from the impact tool is vented into the interior of the replacement pipe, which is unacceptable for certain types of pipe installations, such as gas and water lines. The Streatfield et al. method is also less effective on ductile or non-frangible pipes such as copper, lead and certain types of plastic, such as HDPE.

Directional borers are less effective for pipe bursting, especially for hard to burst pipes like cast iron, because the steady pushing force of the drill string lacks the impact power of a pneumatic impact boring tool. Thus, in some instances, a directional borer or winch is used to pull a pneumatic impact tool through a existing pipeline in order to burst the existing pipe and pull in the replacement pipe. These alternatives are effective but require considerable equipment and manual labor.

Expanders are tapered, ring-shaped shells that fit over the tapered nose portion of a pneumatic earth boring tool in order to widen the hole made by the tool as it passes through the ground. In this manner, a 4-inch diameter tool may be used to make a 6- or 8-inch diameter hole. The tool is often sent through to make an initial bore, and then sent through a second time with the expander in order to widen the existing hole and/or crack an existing pipe. A plastic pipe may be attached to the back of the expander with the above described reversible tool inside the pipe so that the pipe is installed as the tool bores through the soil, with or without additional widening of the bore. The tool body is disposed inside the replacement pipe, and in this arrangement friction between the expander and the soil serves to keep the tool and expander from moving backward during the rearward stroke of the striker.

Problems are encountered as the tool advances further into the ground and the weight of the pipe being drawn behind the tool grows progressively greater. The ground piercing tool relies on friction with the surrounding soil to prevent it from moving backward during the rearward stroke of the striker the same distance the tool moved forward when the striker made its forward impact. The elasticity of the pipe drawn behind the tool can counteract this frictional force, slowing and eventually stopping the tool.

To remedy this difficulty, it is known to attach a cable to the front end of the impact ground piercing tool and use a winch to apply a continuous pulling force to the tool in the forward direction. The cable is threaded through the existing pipeline or a pilot hole and serves to keep the tool moving and prevent it from deviating from its proper course. While it is possible to push on the existing pipeline from behind instead of pulling on the ground piercing tool using a cable, the pushing operation is less effective because it increases the chance that the ground piercing tool will deviate from the desired path.

A less widely known tool makes use of a splitting wedge to separate the old pipe while simultaneously expanding the ground pulling in and replacement pipe. A wire rope as large as the old pipe will accommodate is passed through the inside of the pipe, and a splitter/expander/pipe puller mechanism is attached to the end of the rope. The free end is attached to a backhoe or pickup truck. Such a method of pulling is usually very disturbing to the traffic flow in the area used. The splitter is pulled through the ground, performing the splitting, expanding and pulling functions as described. The old pipe is slit rather than shattered into fragments, and remains in the ground after the wedge has passed. This device is known as 'The Wedge' Tool and is offered by Footage Tools of Canada.

There are several weaknesses or disadvantages in using Footage Tool device. Because there are large pieces of equipment moving great distances in a direction perpendicular to street traffic, there will be safety concerns. Clearance space in the enlarged bore is needed to accommodate both the new pipe and old split pipe. Failure to create this clearance can result in breaking the new pipe as the process gets further into the bore. Friction between the old pipe, the ground and the new pipe will hold the new pipe back and continually increase the tensile load on the new pipe. The old pipe split sections tend to 'clutter' the bore as they are now irregularly shaped. The need to create a large bore means additional pulling force must be applied to the wire rope. Unfortunately, in most cases the existing pipe is small in diameter. Therefore, the wire rope must be small as well. This combination of high pulling forces required to create a large bore and using a small wire cable often results in a broken cable.

The present inventors have discovered that this technique, despite its apparent simplicity, is slow and fraught with problems. First, the need for heavy equipment is not avoided. The backhoe or winch truck must be positioned above a fairly large exit pit. The exit pit for a gas line is typically near the gas main and thus near the street, so the prior methods may require tearing up a large section of roadway and/or blocking traffic with equipment.

This method also is prone to jamming and breakage of the cable. The present inventors have discovered that ductile pipes such as plastic, when slit, tend to bunch up against the new pipe as it is drawn into place, eventually causing the wedge to become stuck or the cable to break. The present invention addresses these drawbacks.

SUMMARY OF THE INVENTION

A method for replacement of an existing pipeline according to the invention includes the initial step of creating open access to opposite ends of an existing pipeline to form an entry opening and an exit opening. A cable is threaded through the existing pipeline and a wedge is mounted on the cable so that the wedge is positioned proximate one of the ends of the existing pipeline. The wedge is pulled through the pipeline from the other end of the existing pipeline so that the wedge slits the existing pipeline to form a slit pipe in a borehole. The slit pipe is then removed from the borehole, and the new or replacement pipe is then inserted (by pulling or pushing) into the borehole after the slit pipe has been removed.

According to a preferred form of this method, the front end of the new pipe is attached to rear end of the slit pipe, and the slit pipe is used to pull the replacement pipeline into the borehole as the slit pipe is being removed. In the alternative, the cable may be reinserted into the borehole after the slit pipe is removed, attached to the new pipe and used to pull the new pipe through the borehole.

Another alternative for removing the slit pipe from the borehole and pulling a replacement pipeline into the borehole involves attaching a front end portion of the slit pipe to a free end of the cable and then pulling the slit pipe out of the borehole from the entry opening, whereby the cable is drawn into the borehole as the slit pipe is removed therefrom. The cable is then attached to a front end portion of the replacement pipe when the slit pipe has been removed from the borehole and the replacement pipe is then pulled into the borehole with the cable.

A boring apparatus useful in the foregoing method includes a cable and a boring head, preferably a set of boring heads of varying sizes. Each boring head has a lengthwise bore of sufficient diameter so that the cable can pass therethrough. A stop is disposed on the cable so that the boring head can be towed through the ground by the cable with the stop portion of the cable in contact with a rear portion of the boring head. The boring heads have cutting edges in a variety of sizes and can be interchangeably mounted on the cable and secured by the stop. The apparatus may further include a set of expander sleeves of varying outer diameters, wherein each boring head has a rear annular flange onto which one of the set of expander sleeves can be removably mounted. Each expander sleeve has a larger maximum outer diameter than the boring head.

Another form of pipe replacement system according to the invention includes a cable having a wedge mounted thereon configured for slitting an existing pipeline as the cable is pulled through the existing pipeline. A pulling machine such as a winch is provided for pulling the cable through the existing pipeline. The system further includes suitable means for attaching a rear end portion of a slit pipe section to a front end portion of the replacement pipe at the entry opening, such as a self-tightening pipe pulling mesh, a mechanical clamp or coupling, or even an adhesive connector such as duct tape.

The invention further provides an improved system for mounting a boring head on a cable. An insert such as a cylindrical steel pin is disposed inside a loosened, enlarged diameter portion of a braided cable so that braids of the cable are wound about the insert. This forms a stop having a diameter too large to pass through the bore of the boring head. The boring head can be towed through the ground by the cable with stop portion of the cable in contact with a rear portion of the boring head.

BRIEF DESCRIPTION OF THE DRAWINGS

The apparatus of the present invention is further described and explained in relation to the following figures, wherein like reference numerals are used to indicate like parts in all figures, and wherein.

DETAILED DESCRIPTION OF PREFERRED EMBODIMENTS

Figure 1:
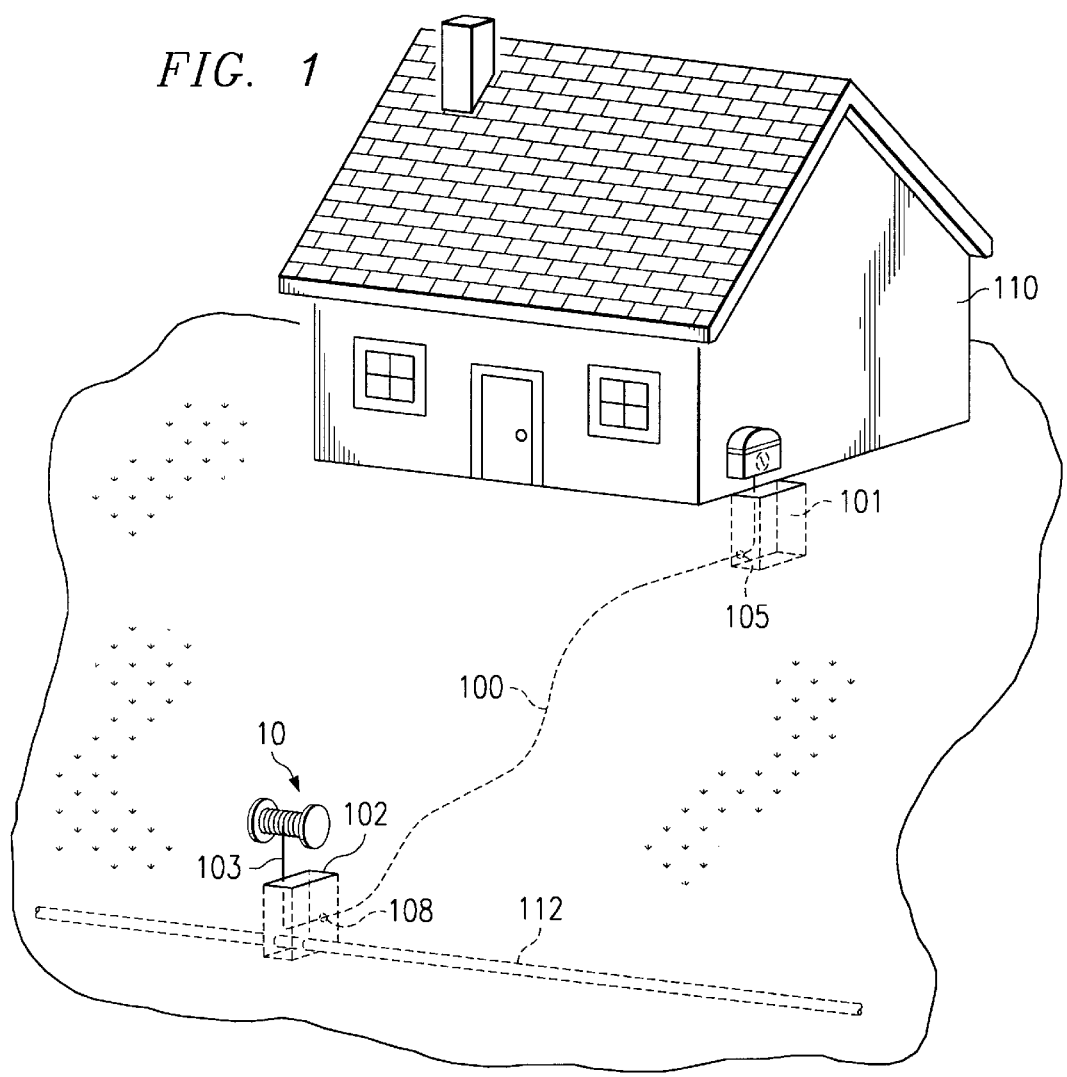
FIG. 1 is a schematic diagram of a pipe replacement operation in accordance with the invention.
Figure 2:
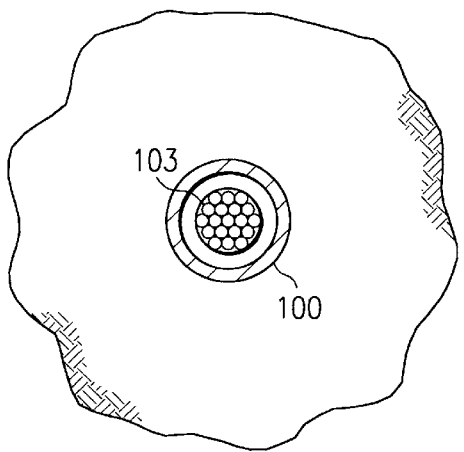
FIG. 2 is a cross-sectional view of the existing pipeline buried in the ground. A pulling cable is shown within the existing pipeline.
Figure 3:
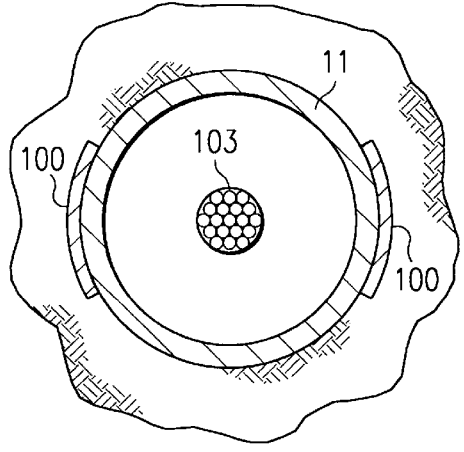
FIG. 3 is a cross-sectional view of the existing pipeline slit in two pieces by the present invention.
Figure 4:
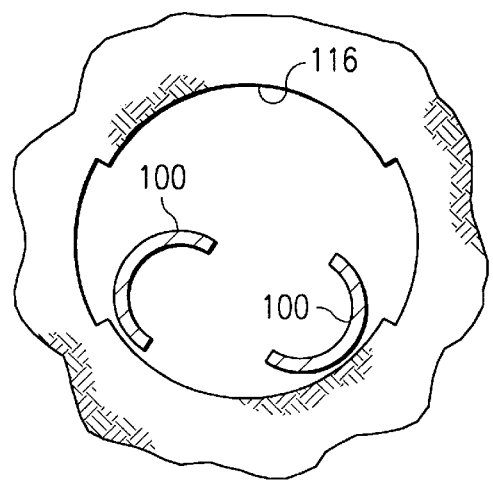
FIG. 4 is a cross-sectional view of the enlarged borehole showing the slit pieces of the existing pipeline within the enlarged borehole after the apparatus of the present invention has been removed.
Figure 5:
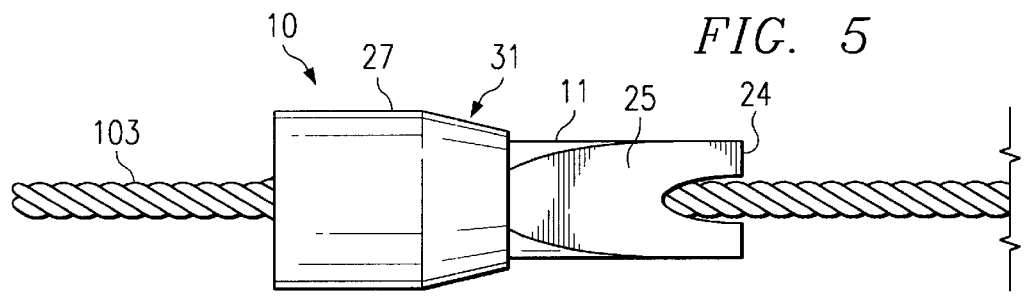
FIG. 5 is a side view of a boring head according to the invention mounted on a section of pulling cable.
Figure 6:
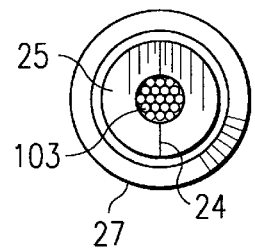
FIG. 6 is a front view of the wedge or boring head mounted on a pulling cable shown in cross-section.

All buildings supplied with municipal water or natural gas are connected to the main (the pipeline that supplies gas or water to the general area) by a small diameter pipe known as a service connection. It is common to have need to replace this connection due to deterioration over time or due to a poor choice of pipe materials at some time in the past. In particular, many HDPE gas line pipes installed in the 1960's were defective and are now failing.

In water lines, leaks may occur or loss of flow due to calcium buildup in water lines begins. For house connections in the U.S. or Europe, these older water or gas pipelines are typically made of plastic or copper for gas supply, water lines can be plastic, copper or very commonly lead. All of these materials are relatively low strength, ductile and easy to split. Lead pipes are especially a concern to health and to the environment and therefore need to be removed. Typically the pipes connecting the main to a residential home will be small in diameter. For plastic gas pipe, the inside diameter may be as small as 0.38". Often the pipe replacing the old line will be the same size or slightly larger.

The method and apparatus of the invention reduce the frictional load on the new pipe in order to reduce the tensile failures encountered with the devices discussed above. It is important when replacing a non-frangible pipe not to pull in the new pipe as the old pipe is slit and expanded. In one version of the present invention, the existing pipe is first slit, then after slitting, the loose ends of the old pipe are attached to the new pipe and the old pipe is used as the tensile member or cable to pull the new pipe in. The bore does not need to be expanded as far because the old pipe sections are not left in the bore to take up room, and problems with jamming against the old pipe are avoided. Reducing the degree of expanding lowers the pulling load, and cable breakage is not a problem. Machine operation is safer as well because a relatively small portable winch may be used in lieu of a backhoe or truck-mounted winch. The invention in particular provides a method and apparatus for replacing an existing pipeline with a new pipeline without having to dig a trench along the entire or substantially the entire length of the pipeline, and permits splitting an existing pipeline while simultaneously enlarging the existing borehole to facilitate the removal of the existing pipeline and the insertion of the replacement pipeline.

The slit pipe may be slit into two or more slit pipe sections by the wedge. The existing pipeline is preferably made of a non-frangible or ductile material. The existing pipeline may have an outer diameter in the range of 0.5 to 6 inches, most commonly 0.5 to 1.5 inches, and is most of made of plastic, copper or lead.

Referring now to FIGS. 1 to 7, a method for replacement of an existing pipeline 100 generally includes the steps of creating open access to opposite ends of an existing pipeline 100 to form an bore hole entry opening (entry pit) 101 and a bore hole exit opening (exit pit) 102. A cable 103 having a wedge 11 mounted thereon as described hereafter is threaded through the existing pipeline 100 and placed so that the wedge 11 is positioned in entry pit 101 near one end of the existing pipeline. Wedge 11 is pulled through pipeline 100 from a front end 105 of the existing pipeline 100 so that the wedge 11 slits the existing pipeline 100 to form a slit pipe 100 in a borehole 116. The slit pipe 100 is then removed from borehole 116 and a replacement pipeline 107 is pulled into the borehole 116 after the slit pipe 100 has been removed.

Referring to FIGS. 5 to 8, an apparatus 10 for replacement of the existing pipeline 100 includes a cable 103 with a boring head 31 mounted thereon. Boring head 31 includes a wedge or cutting head 11 mounted on cable 103 and an expander sleeve 27 seated on wedge 11. Wedge 11 has a lengthwise bore 19 of sufficient diameter so that the cable can pass therethrough. Wedge 11 has a frontwardly tapering outer cutting surface 25 which terminates in a blade or front cutting surface 24, and a rear annular flange 26 on which expander 27 is retained. Cutting surface 25 is configured for slitting existing pipeline 100, preferably with a blade that splits pipeline 100 into two or more pieces, though a single slit may be sufficient. The front edge cutting surface 24 of tapering surface 25 should be made of a steel capable of holding a sharpened edge. Expander sleeve 27, which defines the size of the resulting bore hole 116, is generally cylindrical and has a larger maximum outer diameter than the boring head 31.

Cable 103 is preferably made of braided steel wires. An insert 20 is disposed inside a loosened, enlarged diameter portion of braided cable 103 so that braids 109 of the cable are wound about insert 20, forming a stop portion 22 of the cable. Stop portion 22 has a diameter insufficient to pass through the bore 19 of the boring head, so that the wedge 11 can be pulled through the ground by cable 103 with stop portion 22 of the cable in contact with a rear portion 23 of the boring head 31. Insert 20 may be a cylindrical pin disposed with an longitudinal axis in alignment with a lengthwise direction of the cable. An inner section of the cable core (e.g., the inner three strands shown) may be severed and removed over the length of pin 20 if necessary to create additional space to receive pin 20.

Figure 10:
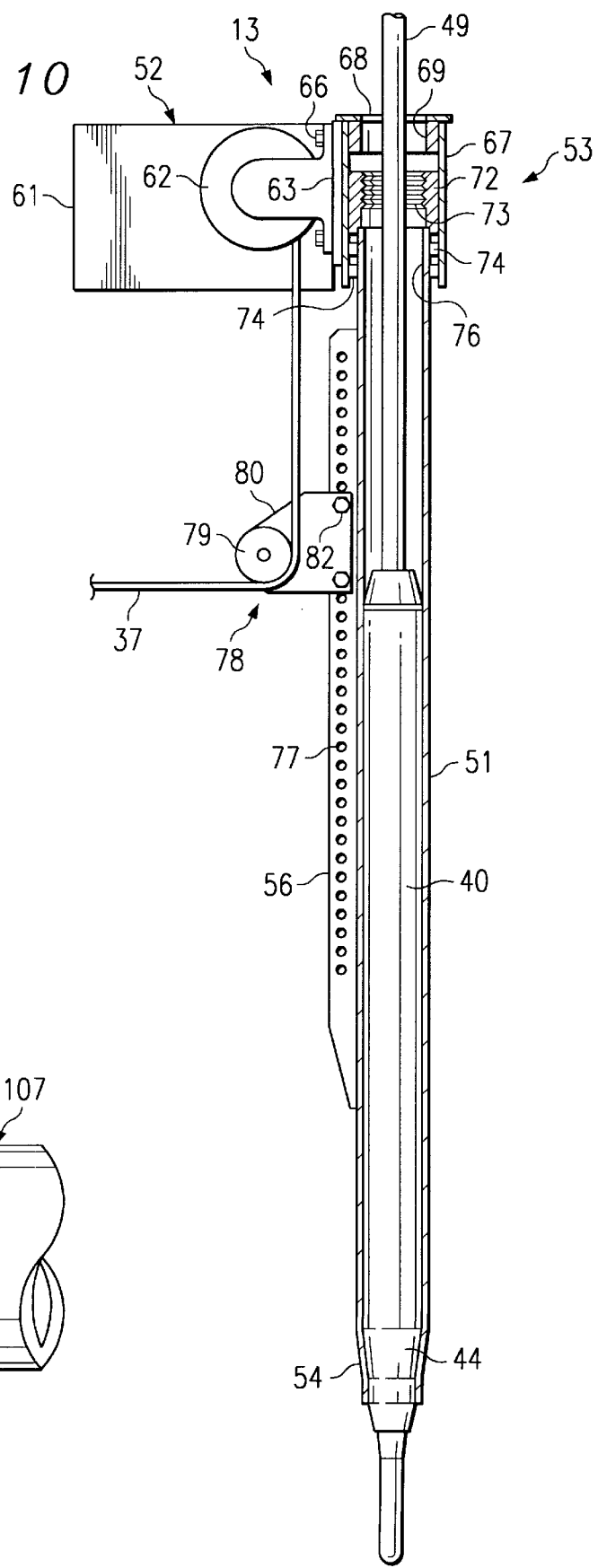
FIG. 10 is a side view, partly in section, of a portable pulling apparatus suitable for use in the invention.

The step of pulling the wedge 11 through the pipeline is carried out using a suitable pulling device such as a winch or backhoe, most preferably a portable pulling device 13 such as the one described in commonly-assigned U.S. patent application Ser. No. 08/888,893, filed Jul. 7, 1997, the contents of which are incorporated by reference herein. Referring to FIG. 10, portable pulling device 13 includes an elongated, tubular steel stake 51, a winch 52, and a fixture 53 for mounting winch 52 on an upper end portion of stake 51. Steel stake 51 has a reduced diameter bottom portion 54. Bottom portion 54 is tapered to complement the taper of a nose portion 44 of a pneumatic impact tool 40 used to drive stake 51 into the ground. Stake 51 may have one or more spaced fins 56 (for example, three equiangular fins) provided to help the stake hold its position.

Winch 52 may be a conventional electric unit or a pneumatic unit such as a Thern model 4771. Winch 52 includes a motor disposed within a housing 61 and a cable winding drum 62 on which cable 37 is wound and unwound during operation. Winch 52 may be run using the same air hose used to run the impact tool 40.

Fixture 53 is used to mount winch 52 on the upper end of stake 51. Fixture 53 includes a bracket plate 63 having holes by which winch 52 is mounted to plate 63 by suitable means such as welding or nuts and bolts 66. Plate 63 is welded to the side of a cylindrical sleeve 67 having an inner diameter slightly greater than the outer diameter of stake 51. A lid 68 having an annular flange 69 fits closely in the upper end of sleeve 67. Lid 68 has a central slot or similar aperture through which an air hose 49 can pass.

Stake 51 may be provided with a tubular extension 72 at its upper end to make up a difference in diameter between stake 51 and sleeve 67. Threads 73 are provided on an inner surface of extension 72 for engagement with a tubular insert as described hereafter. Spacers 74 may be provided on the outside of stake 51 at an upper end portion 76 thereof so that sleeve 67 fits securely onto upper end portion 76 of stake 51.

At least one fin 56 acts as an external bracket that extends from upper end portion 76 of stake 51. A row of spaced holes 77 in fin 56 permit a pulley 78 to be mounted over a range of positions as needed to center cable 37 horizontally within the existing pipeline 100. Pulley 78 includes a rotatable grooved wheel 79 mounted on a plate 80 which is secured to fin 56 by nut and bolt assemblies 82. Cable 37 extends downwardly from winch drum 62 and is wound approximately 90 about wheel 79 so that it can extend into the pipeline 100.

Figure 9:
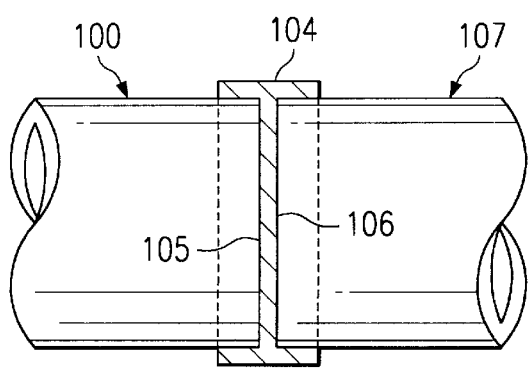
FIG. 9 is an enlarged portion of an existing pipeline removably connected to a replacement pipeline.

Portable pulling apparatus 13 is used in combination with cable 103 and boring head 31 to slit the old pipe 100, which must then be removed. FIG. 9 illustrates a coupling 104, such as several windings of duct tape, that attaches a rear end portion 105 of a slit existing pipe section 100 to a front end portion 106 of a replacement pipe 107 at the entry opening 102. In the alternative, portions 105, 106 could be connected end to end by riveting the two pipes to each other, using a gripping sleeve, welding, or using an adhesive to attach them to each other.

The method of the invention which uses the foregoing components will be illustrated for a typical residential gas connection as shown in FIGS. 1 to 4. The gas shutoffs for the main line and the service connection lines are first located and turned off. Entry pit 101 is dug at an outside wall of the residence, structure or building 110 at a location at which the existing gas line 100 enters the residence, structure or building, generally at gas meter 111. A first segment (not shown) of the gas line 100 which adjoins the residence 110 is cut, if necessary, with a pipe cutter and manually removed to expose an open front end 105 of the gas line at one side wall of entry pit 101.

A second excavation is made at the location where the gas line 100 connects to the gas main 112 to form the exit pit 102. The excavations may be of any size that allows the work to be performed easily and safely, but are preferably of the minimum size necessary. It is desirable to avoid digging long open trenches in streets or residential areas, and the present invention can often be carried out with pits 101, 102 that are substantially square at the point where pits 101, 102 open onto the surrounding ground. A second segment (not shown) of gas line 100 which adjoins the gas main 112 is removed to expose a rear open end 108 of the gas line.

Installation of apparatus 13 in the exit pit 102 is carried out by placing tool 40 into the bottom of stake 51 as shown in FIG. 10 with tapered surfaces in engagement as shown. Winch 52 and fixture 53 may be removed temporarily and remounted once stake 51 has been set. Tool 40 is run in forward mode to drive a lower end portion of stake 51 into the ground a sufficient distance so that stake 51 will remain secure. Tool 40 may be left in place until it is time to remove stake 51. In the alternative, tool 40 may be run in reverse to disengage nose 44 from tapered lower end portion 54 and then removed through the top of stake 51. Once stake 51 is set, fixture 53 and winch 52 are mounted on its upper end with the free end of cable 103 positioned to enter rear open end 108. If necessary, lateral braces (not shown) are set between apparatus 13 and the pit walls to further secure pulling apparatus 13 in place.

Figure 7:
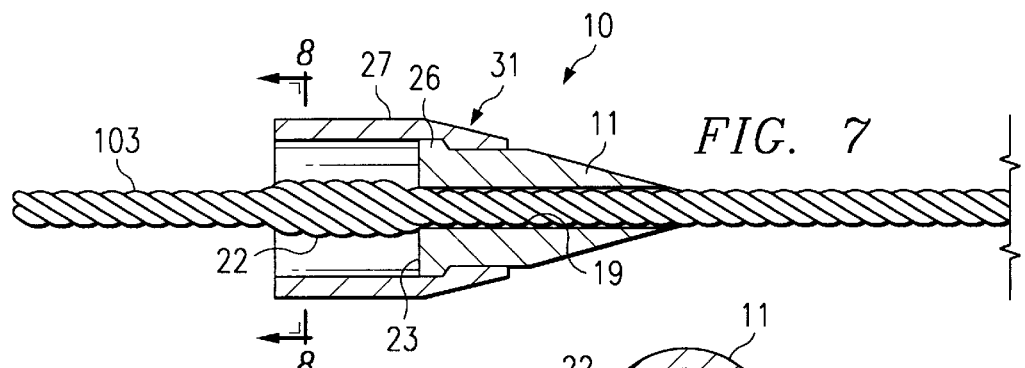
FIG. 7 is a is a cross-sectional view of the wedge or boring head showing the expander sleeves attached to the rear annular flange of the boring head and showing a cut-away view of the stop and showing the insert within the pulling cable.
Figure 8:
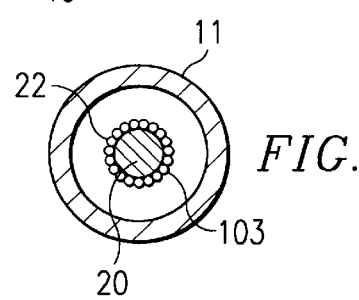
FIG. 8 is a cross-sectional view of the insert and stop taken along lines 8—8.

The cable 103 is fed (threaded) through rear opening 108 of the existing pipeline 100 nearest the main until a sufficient portion of the cable projects out of the pipe entry opening 105 nearest the residence 110. Wedge 11 is placed onto the free end of cable 103, and a stop portion 22 is fashioned by loosening the braid 109 on the cable at a preselected point and if necessary cutting a portion of the cable core 115 out approximately equal to the length of an insert. Insert 20, which is typically larger than the diameter of core 115, is inserted into the loosened part of cable 103 and the braid 109 is then re-tightened around insert 20. Cable 103 then pulls stop 22 into contact with wedge 11 as shown in FIG. 7.

The operator places expander 27 on rear annular flange 26 of the boring head 31, choosing one from among a set of expander sleeves 27 of varying diameter. The operator selects the size of expander sleeve that will enlarge the bore hole 116 to a preferred diameter. As boring head 31 is pulled through the existing pipe 100, the borehole 116 is formed by expander 27, making removal of the split existing pipeline and insertion of the replacement/new pipeline much easier.

It may be expedient to use a tool such as a hacksaw to cut two opposing slots in the end 105 of the existing pipeline 100 to provide the cutting edges 24 a positive place to begin a slit. Cutting edge(s) 24 is placed in position, and cable 103 is reeled in by winch 52, taking the slack out of the cable until cutting edge 24 begins slitting the pipe preferably in two nearly symmetrical halves; however, a single slit leaving the pipe 100 as a single piece is also acceptable. The loose portion (the portion not securely contained within the ground) of existing pipe 100 should be observed closely as the slitting operation begins so that it does not buckle. Wedge 11 is pulled through pipe 100 until it is completely slit and wedge 11 exits the pipe. Apparatus 13 applies a continuous pulling force on wedge 11 which keeps wedge 11 moving forward even over long pipeline runs without the need for a large, truck mounted winch.

The steps of removing the slit pipe 100 from borehole 116 and then pulling replacement pipeline 107 into the borehole may be carried out in several ways. One preferred method uses the arrangement shown in FIG. 9. A rear end portion 105 of the slit pipe is coupled to a front end portion 106 of the replacement pipe 107 at the entry pit 101, and then the slit pipe 100 is pulled out, manually or using any suitable pulling machine, from the exit opening 102. The replacement pipe 107 is drawn into the borehole as the slit pipe is removed therefrom, but the old pipe poses no obstacle and eliminates the need to re-thread a cable back through the bore. The slit pipe is detached from the replacement pipe once the slit pipe has been removed from the borehole.

In the alternative, the operator may pull the existing slit pipe 100 from the borehole 116, thread cable 103 back through the borehole 116, connect the replacement pipe 107 to the cable 103 and pull the replacement pipe 107 through the bore hole from the entry opening 101 toward the main.

As another alternative, the operator may remove boring head 31 and attach a rear end of slit pipeline 100 to cable 104 by any suitable means, e.g., per coupling 104. Slit pipeline 100 is then removed backwards by pulling it manually from the entry pit 101, and at the same time the cable 103 is unwound and re-threaded through borehole 116. Cable 103 is then removed from pipeline 100, reattached to front end 106 of replacement pipe 107, and winch 52 is operated to pull replacement pipe 107 into borehole 116. It may also prove feasible to cap the end of replacement pipe 107 and feed it into borehole 116 after removal of the existing pipeline 100 by pushing rather than pulling, either manually or using a known pipe pushing or directional boring machine.

Once the current run is complete and wedge 11 has emerged into exit pit 102, tool 40 is replaced at the bottom of stake 51 (if previously removed) and a tubular insert is installed in stake 51 behind tool 40 by means of threads 73 so that insert 81 contacts the back of tool 40. Tool 40 is then run in reverse to retract stake 51 out of the ground together with tool 40. Portable pulling device 13 works well in the method of the present invention because the method requires less pulling force, since the new pipe is not installed at the same time as the old pipe is being slit. Pulling device 13 can fit entirely within existing pit 102, eliminating the obstruction to traffic created by a larger, truck mounted winch or backhoe.

Once the replacement pipe 107 is in the bore hole, the operator should check to make sure that the replacement pipe is free of debris and provides a full flow passage. The replacement pipe 107 may then be reconnected to the meter 111 and to the main 112. The shut-off valves may be reopened and the line checked for leaks. If the leak check is satisfactory, pits 101, 102 are refilled, the equipment removed and the area cleaned and restored. The extent of restoration is substantially less than for present practiced methods because both the entry and exit pits may be of reduced size. Removal of the slit pipe prior to installation of the replacement pipe also had the surprising effect of greatly reducing the time needed to complete the run from several hours to as little as 45 minutes. Other advantage, alterations and modifications of the invention will become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for replacement of an existing pipeline, comprising:

creating open access to opposite ends of an existing pipeline to form an entry opening and an exit opening;

mounting a wedge on a cable;

threading the cable through the existing pipeline;

positioning the wedge proximate one of the ends of the existing pipeline;

pulling the wedge through the pipeline from the other end of the existing pipeline so that the wedge slits the existing pipeline to form a slit pipe in a borehole;

removing the slit pipe from the borehole; and pulling a replacement pipeline into the borehole after the slit pipe has been removed.

2. The method of claim 1, wherein the steps of removing the slit pipe from the borehole and then pulling a replacement pipeline into the borehole comprise:

attaching a rear end portion of the slit pipe to a front end portion of the replacement pipe at the entry opening;

pulling the slit pipe out of the borehole from the exit opening, whereby the replacement pipe is drawn into the borehole as the slit pipe is removed therefrom; and detaching the slit pipe from the replacement pipe when the slit pipe has been removed from the borehole.

3. The method of claim 1, wherein the steps of removing the slit pipe from the borehole and then pulling a replacement pipeline into the borehole comprise:

attaching a front end portion of the slit pipe to a free end of the cable;

pulling the slit pipe out of the borehole from the entry opening, whereby the cable is drawn into the borehole as the slit pipe is removed therefrom;

attaching the cable to a front end portion of the replacement pipe when the slit pipe has been removed from the borehole; and pulling the replacement pipe into the borehole with the cable.

4. The method of claim 1, wherein the slit pipe is slit into two or more slit pipe sections by the wedge.

5. The method of claim 1, wherein the existing pipeline is made of a non-frangible material.

6. The method of claim 5, wherein the existing pipeline has an outer diameter in the range of 0.5 to 6 inches.

7. The method of claim 5, wherein the existing pipeline has an outer diameter in the range of 0.5 to 1.5 inches.

8. The method of claim 6, wherein the existing pipeline is made of a material selected from plastic, copper and lead.

9. The method of claim 1, wherein the existing pipeline is made of plastic and has an outer diameter in the range of 0.5 to 1.5 inches.

10. The method of claim 1, wherein the step of pulling the wedge through the pipeline is carried out using a portable pulling device which comprises an elongated stake having a lower end portion configured for insertion into the ground and an upper end portion, a winch including the cable, and a fixture for mounting the winch on the upper end portion of the stake so that the winch can operate to exert a horizontal pulling force with the cable and is secured against movement when the lower end portion of the stake is inserted into the ground, wherein the method further comprises:

securing the portable pulling device in the ground near the exit opening; and pulling the cable through the existing pipeline with the winch.

11. The method of claim 1, wherein the existing pipeline is a residential gas line running from a residence to a gas main.

12. The method of claim 11, wherein the step of creating open access to opposite ends of the existing pipeline comprises:

making a first excavation at an outside wall of the residence at a location at which the gas line enters the residence;

removing a first segment of the gas line which adjoins the residence to expose an open end of the gas line in the entry opening;

making a second excavation at a location at which the gas line connects to the gas main; and removing a second segment of the gas line which adjoins the gas main to expose an open end of the gas line in the exit opening.

13. The method of claim 1, wherein the cable is a braided cable, and the wedge comprises a boring head having a lengthwise bore of sufficient diameter so that the cable can pass therethrough, further comprising:

disposing an insert inside a loosened, enlarged diameter portion of the braided cable so that braids of the cable are wound about the insert, forming a stop portion of the cable having a diameter insufficient to pass through the bore of the boring head, so that the boring head can be towed through the ground by the cable with a stop portion of the cable in contact with a rear portion of the boring head.

14. The method of claim 1, wherein the step of removing the slit pipe sections from the borehole comprises pulling the slit pipe sections from the borehole.

15. An apparatus for replacement of an existing pipeline wherein an entry opening and an exit opening are formed to create open access to opposite ends of the pipeline, comprising:

a cable having a wedge mounted thereon configured for slitting an existing pipeline as the cable is pulled through the existing pipeline;

a pulling machine for pulling the cable through the existing pipeline; and means for attaching a rear end portion of a slit pipe section to a front end portion of the replacement pipe at the entry opening, the split pipeline being adapted for drawing a replacement pipe through the opening.

16. The apparatus of claim 15, wherein the pulling machine comprises a portable pulling device including an elongated stake having a lower end portion configured for insertion into the ground and an upper end portion, a winch including a pulling cable, and a fixture for mounting the winch on the upper end portion of the stake so that the winch can operate to exert a horizontal pulling force with the cable and is secured against movement when the lower end portion of the stake is inserted into the ground.

17. A boring apparatus, comprising:

a braided cable;

a boring head having a lengthwise bore of sufficient diameter so that the cable can pass therethrough; and an insert disposed inside a loosened, enlarged diameter portion of the braided cable so that braids of the cable are wound about the insert, forming a stop portion of the cable having a diameter insufficient to pass through the bore of the boring head, so that the boring head can be towed through the ground by the cable with stop portion of the cable in contact with a rear portion of the boring head.

18. The apparatus of claim 17, wherein the insert comprises a cylindrical pin disposed with an axis in alignment with a lengthwise direction of the cable.

19. The apparatus of claim 17, wherein the boring head comprises a frontwardly tapering outer cutting surface and a rear annular flange on which an expander sleeve having a larger maximum outer diameter than the boring head is removably mounted.

20. A method for replacement of an existing pipeline comprising:

creating open access to opposite ends of an existing pipeline to form an entry opening and an exit opening;

mounting a wedge on a braided cable;

threading the cable through the existing pipeline, the wedge comprising a boring head having a lengthwise bore of sufficient diameter so that the cable can pass therethrough;

disposing an insert inside a loosened, enlarged diameter portion of the braided cable so that braids of the cable are wound about the insert, forming a stop portion of the cable having a diameter insufficient to pass through the bore of the boring head, so that the boring head can be towed through the ground by the cable with a stop portion of the cable in contact with a rear portion of the boring head;

positioning the wedge proximate one of the ends of the existing pipeline;

pulling the wedge through the pipeline from the other end of the existing pipeline so that the wedge slits the existing pipeline to form a slit pipe in a borehole;

removing the slit pipe from the borehole; and pulling a replacement pipeline into the borehole after the slit pipe has been removed.

21. A method for replacement of an existing pipeline comprising:

creating open access to opposite ends of an existing pipeline to form an entry opening and an exit opening;

mounting a wedge on a braided cable;

threading the cable through the existing pipeline;

positioning the wedge proximate one of the ends of the existing pipeline;

pulling the wedge through the pipeline from the other end of the existing pipeline so that the wedge slits the existing pipeline utilizing a portable pulling device which comprises an elongated stake having a lower end portion configured for insertion into the ground and an upper end portion, a winch including the cable, and a fixture for mounting the winch on the upper end portion of the stake so that the winch can operate to exert a horizontal pulling force with the cable and is secured against movement when the lower end portion of the stake is inserted into the ground;

securing the portable pulling device in the ground near the exit opening;

pulling the cable through the existing pipeline with the winch;

removing the slit pipe from the borehole; and pulling a replacement pipeline into the borehole after the slit pipe has been removed.

* * * * *